Patented Dec. 16, 1924.

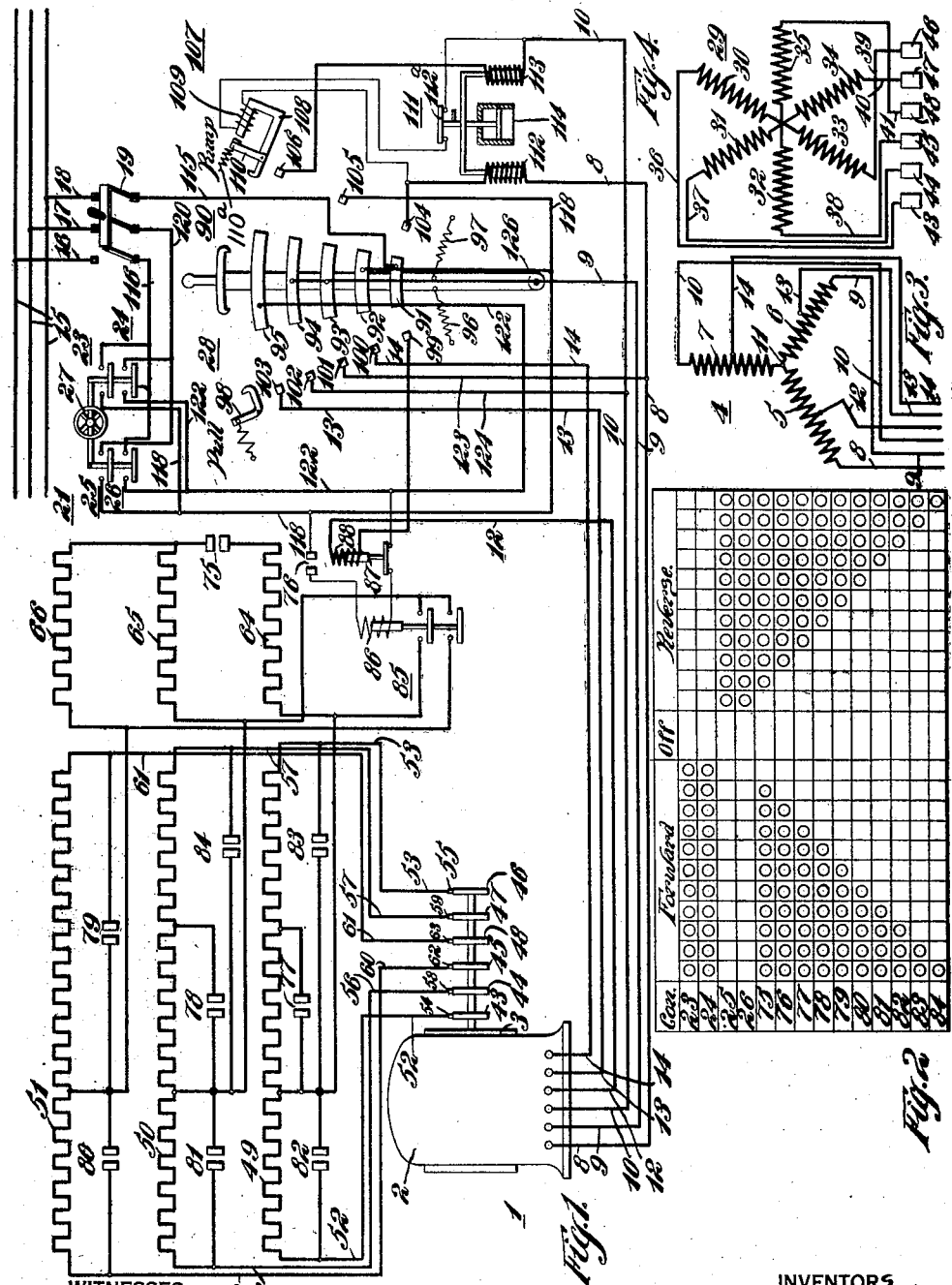

1,519,254

UNITED STATES PATENT OFFICE.

WALTER L. HARTZELL AND GEORGE W. HUEY, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

Application filed October 18, 1920. Serial No. 417,623.

*To all whom it may concern:*

Be it known that we, WALTER L. HARTZELL, a citizen of the United States, and a resident of Wilkinsburg, in the county of Allegheny and State of Pennsylvania, and GEORGE W. HUEY, a citizen of the United States, and a resident of Wilkinsburg, in the county of Allegheny and State of Pennsylvania, have invented a new and useful Improvement in Control Systems, of which the following is a specification.

Our invention relates to motor-control systems and it has particular relation to control systems for motors employed under widely different operating conditions, such, for example, as in the operation of oil wells.

The object of our invention is to provide a simplified control system, having a minimum number of switches, for an induction motor of the wound-secondary type that provides two operating speeds for the motor in accordance with the character of work that is performed in operating oil wells.

A motor for oil-well operation is employed about 98% of the time in pumping and the remainder of the time in pulling casing, fishing for tools, or other work for which great motor torque is required. During pumping of the well, the control system for the motor is so arranged that a circuit breaker is opened upon the occurrence of abnormal current conditions.

When the motor is employed to lift casing, a large amount of resistance is automatically inserted in circuit with the secondary winding of the motor, and the circuit breaker is maintained in its closed position during abnormal current conditions to prevent the release of the motor, which would permit the casing to descend rapidly into the well. Greater power for pulling the casing is also secured by so connecting the primary winding of the motor that the number of poles formed in the motor is one-half that during pumping.

Heretofore, the method of changing the number of poles in the primary winding of an induction motor employed for oil well operation has been by means of a double-throw switch. Such a switch is shown mounted on the motor in Fig. 1 of the copending application of W. L. Hartzell, Serial No. 257,327, filed October 8, 1918, and assigned to the Westinghouse Electric & Manufacturing Company.

Briefly speaking, our invention consists in eliminating the separate double-throw switch that has been employed for changing the number of poles of a motor, by combining it with the starting circuit breaker for the motor. By combining the two devices, a saving is effected in the cost of the control system and in the number of parts required.

With our improved control system, all that is required to start an oil-well motor is to close a standard line switch and then actuate a circuit breaker from its "off" position to either its "pump" or its "pull" position in accordance with the work to be performed. To adapt the motor for a change from one set of operating conditions to the other, all that is necessary is to actuate the circuit breaker from the one position through the "off" position to the other position. It is not necessary to open the line switch during this change.

For a better understanding of our invention, reference may now be made to the accompanying drawing—

Fig. 1 of which is a diagrammatic view of an induction motor adapted for oil-well operation and a control system therefor.

Fig. 2 is a chart showing the sequence of operation of contactors in the system of Fig. 1.

Fig. 3 is a diagrammatic view of a primary winding of the motor shown in Fig. 1, and Fig. 4 is a diagrammatic view of a secondary winding of the motor shown in Fig. 1.

Referring particularly to Figs. 1, 2 and 3, an induction motor 1, having a stator 2 and a rotor 3, is employed for oil-well service.

A primary winding 4, constituting a part of the stator 2 of the motor 1, comprises a plurality of sections or phase windings 5, 6 and 7, (Fig. 3). One terminal of each of the phase windings 5, 6 and 7 is connected to conductors 8, 9 and 10, respectively. The other terminal of each of the phase windings 5, 6 and 7 is connected to the other phase windings at a common point 11. Conductors 12, 13 and 14 are connected to the mid point of each of the phase windings 5, 6 and 7, respectively.

The conductors 8, 9, 10, 12, 13 and 14 may be electrically connected to a source of electrical energy 15 by conductors 16, 17 and 18, a knife switch 19, a controller 21, comprising a plurality of directional or reversing contactors 23, 24, 25 and 26 operated by a sheave wheel 27, and a double-throw five-pole circuit breaker 28.

The rotor 3 of the motor 1 has a secondary winding 29 mounted thereon and forming a part thereof. The secondary winding 29 comprises a plurality of sections or phase windings 30, 31, 32, 33, 34 and 35, one terminal of each being electrically connected to the corresponding terminals of the other secondary phase windings. The sections or phase windings 30, 31, 32, 33, 34 and 35 are connected by conductors 36, 37, 38, 39, 40 and 41, respectively, to slip rings 43, 44, 45, 46, 47 and 48, respectively.

A plurality of resistors 49, 50 and 51 are electrically connected in series with the respective sections or phase windings of the secondary winding 29. The resistor 49 is connected to the slip rings 43 and 46 by conductors 52 and 53, and sets of brushes 54 and 55, respectively, of the motor 1. The resistor 50 is connected to the slip rings 44 and 47 by conductors 56 and 57 and sets of brushes 58 and 59, respectively. The resistor 51 is connected to the slip rings 45 and 48 by conductors 60 and 61 and sets of brushes 62 and 63 of the motor 1.

Additional resistors 64, 65 and 66 are connected in series with the secondary winding 29 of the motor 1, when both the circuit breaker 28 is in its "pull" position and the motor 1 has been brought to a dangerously low speed, due to an abnormal overload.

The resistors 49, 50, 51, 64, 65 and 66 may be shunted by contactors 75, 76, 77, 78, 79, 80, 81, 82, 83 and 84. These contactors may be of the well-known "cam" type and may be controlled by the sheave wheel 27 of the controller 21, or they may be provided with actuating coils and controlled by a plurality of circuits and relays, the operation of the accelerating contactors being made dependent upon the counter-electromotive force of the motor 1.

Fig. 2 shows the sequence in which the directional or reversing contactors 23, 24, 25 and 26 and the resistance contactors 75, 76, 77, 78, 79, 80, 81, 82, 83 and 84 close. The operation of all of these contactors may be controlled from a derrick by a rope (not shown) which is wound upon the sheave wheel 27.

A maximum-torque switch or relay 85 is provided for inserting the resistors 64, 65 and 66 in series with secondary winding 29 of the motor 1 when abnormal current conditions exist, that is when the motor 1 is employed for pulling casing or the like. The relay 85 is provided with an actuating coil 86 which is normally energized during both the "pumping" and the "pulling" operations by being connected directly across two of the conductors carrying current to the primary winding 4 of the motor 1. When the actuating coil 86 is energized, the double-pole contactor or relay 85 is closed and the resistors 64, 65 and 66 are shunted. However, the relay or maximum-torque switch 85 cannot be closed until the cam controller 21 has closed the contactors 75 and 76, for the actuating coil 86 of the switch 85 is de-energized, when the contactor 76 is opened.

The actuating coil 86 of the switch 85 may be de-energized by opening a maximum-torque relay 87. The maximum torque relay 87 is normally closed. It is provided with an actuating coil 88 which is connected, through conductor 12, to the midpoint of the phase winding 5 of the primary winding 4 of the motor 1 and is energized only when the circuit breaker 28 is in its "pull" position.

During pulling operations, if the current in the conductor 12 rises to a predetermined value, it will sufficiently energize the actuating coil 88 to open the contactor 87, thereby de-energizing the actuating coil 86 of the double-pole maximum torque switch or contactor 85. The resistors 64, 65 and 66 are then inserted in an electrical circuit comprising the secondary phase winding 29 of the motor 1.

This method of automatically inserting resistance in circuit with the secondary member of a motor employed in oil-well operation and the increased torque secured by the motor is fully described in the copending application to which reference has been made.

The particular inventive feature of the present invention is combining a double-throw switch with a circuit breaker and so arranging the overload relays and no-voltage release device which are similar to those employed in the prior system that they will function only during certain operating conditions, as in the previous system.

The circuit breaker 28 comprises an arm or bar 90 having a plurality of contact segments 91, 92, 93, 94 and 95 mounted thereon. The arm 90 is biased to its central position by resilient members 96 and 97.

When the arm 90 is actuated to the "pull" position of the circuit breaker 28, it is held in position by a holding or locking device 98. The locking device 98 is independent of the electrical conditions of the control system, and the arm 90 cannot be released except by the operator actuating it independently.

In the "pull" position, the contact segments 91, 92, 93, 94 and 95 of the arm 90 engage contact terminals 99, 100, 101, 102 and 103, respectively. In the "pumping" position, contact segments 91, 93 and 95 of the arm 90 engage contact terminals 104, 105 and 106. When the arm 90 of the circuit breaker 28 is in the "pumping" position, the contact segments 92 and 94 are not in engagement with any contact terminals.

The arm 90 of the circuit breaker 28 is held in the "pumping" position by the no-voltage release device 107 comprising a core member 108, an energizing coil 109 and an armature member 110 having a spring 110$^a$ to bias it to its open position. When the coil 109 becomes sufficiently de-energized, the armature member 10 opens, releasing the arm 90 to return to its central or "off" position.

An overload relay 111, having a contact member 112$^a$ and two actuating coils 112 and 113 in series with conductors 8 and 10, respectively, controls the energization of the coil 109 of the no-voltage release device 107. The relay 111 is provided with a dashpot 114 for delaying the operation of the relay 111 to break the circuit comprising the coil 109 of the no-voltage release 107. If the overload in coil 112 or 113 is of less duration than the time required for the relay 111 to open, the relay 111 will remain closed.

The operation of the motor for "pumping" is begun, after closing the knife switch 19, by bringing the arm 90 of the circuit breaker 28 to the "pumping" position. The directional contactors 23 and 24 or 25 and 26 are next closed or they may be closed prior to closing the circuit breaker 28.

When the sheave wheel 27 is so actuated that the contactors 23 and 24 are closed, the three sections or phase windings 5, 6 and 7 of the primary winding 4 of the motor 1 are electrically connected to the supply source of energy or conductors 15. The outer terminal of the phase winding 5 is connected to one of the supply conductors 15 through conductor 18, knife-blade switch 19, conductor 115, contact segment 91 of arm 90 of circuit breaker 28, contact terminal 104, actuating coil 112 of overload relay 111 and conductor 8 to the phase winding 5 of primary winding 4 of the motor 1.

The outer terminal of the phase winding 6 of primary winding 4 of the motor 1 is connected to one of the supply conductors 15 through conductor 16, knife-blade switch 19, conductor 116, contact members of contactor 23, conductor 118, contact terminal 105, contact segment 93 and conductor 9 to phase winding 6 of primary winding 4 of motor 1.

The outer terminal of the phase winding 7 of the primary winding 4 of the motor 1 is connected to one of the supply conductors 15 through conductor 17, knife-blade switch 19, conductor 120, contact members of directional contactor 24, conductor 122, contact segment 95 of arm 90 of circuit breaker 28, contact terminal 106, actuating coil 113 of the overload relay 111 and conductor 10 to phase winding 7 of primary winding 4 of the motor 1.

All of the phase windings 5, 6 and 7 of the primary winding 4 being electrically connected to the supply conductors 15, the motor 1 will start to operate. The contactors 75 to 84, inclusive, may be closed by rotating the sheave wheel 27 of the cam controller 21, thereby shunting the secondary resistors 49, 50, 51, 64, 65 and 66, in the order shown by the sequence chart.

If abnormal current conditions occur in the primary winding 4, the relay 111 will open, thereby breaking the circuit which energizes the coil 109 of the no-voltage release device 107. This will cause armature 110 of no-voltage release device 107 to open, thereby releasing the arm 90 which will return to its central or "off" position.

The direction of operation of the motor 1 may be changed by opening the directional contactors 23 and 24 and closing the contactors 25 and 26, a method which is well known in the art.

If it is desired to operate the motor 1 to obtain greater torque, the speed of the motor 1 is increased by reducing the number of poles in the primary winding 4 thereof. This may be done by actuating the arm 90 of the circuit breaker 28 to the "pull" position.

When the arm 90 is in the "pull" position, conductors 8 and 10 from phase windings 5 and 7 of primary winding 4 are electrically connected to conductor 9 from phase winding 5, for contact segments 93 and 94 are connected to conductor 9 and they engage contact segments 101 and 102, which are connected by conductors 123 and 124, respectively, to conductors 8 and 10, respectively.

The midpoints of the phase windings 5, 6 and 7 are connected to supply conductors 15 by circuits comprising conductors 12, 13 and 14, respectively.

The midpoint of the phase winding 5 of the primary winding 4 of the motor 1 is connected to one of the supply conductors 15 by means of conductor 18, knife-blade switch 19, conductor 115, contact segment 91 of circuit breaker 28, contact terminal 99, actuating coil 88 of contactor 87 and conductor 12.

The midpoint of phase winding 6 of primary winding 4 is connected to one of the supply conductors 15 by means of conductor 17, knife-blade switch 19, conductor 120, contact members of directional contactor 24, conductor 122, contact segment 95 of the arm 90, contact terminal 103 and conductor 13.

The midpoint of phase winding 7 of primary winding 4 is connected to one of the supply conductors 15 by means of conductor 16, knife-blade switch 19, conductor 116, contact members of contactor 23, conductors 118 and 126, contact segment 92, contact terminal 100 and conductor 14.

The midpoints of phase windings 5, 6 and 7 of the primary winding 4 of the motor 1 being connected to the supply source of energy 15 and the terminals of each of the conductors 5, 6 and 7 being electrically connected to the corresponding terminals of each other, the number of poles in the primary winding 4 has been reduced to one half of the number obtaining during "pumping" operations.

The resistors 49, 50, 51, 64, 65 and 66 in series with the secondary winding 29 may be shunted by operating the cam controller 21. The order in which the contactors 75 to 84, inclusive, close is fully set forth in the sequence chart, Fig. 2.

A feature of the previously-mentioned Hartzell application is the control of contactor 85, which automatically inserts resistance in circuit with the secondary winding 29, when the motor 1 is subjected to an abnormal overload during "pulling" operations.

In the present invention, by having the actuating coil 88 of the relay 87 controlled by the conductor 12, which is only energized during "pulling" operations, the contactor 85 which shunts the resistors 64, 65 and 66 will open only when there is abnormal current in the conductor 12.

From the above description, it is apparent that, by employing an automatic circuit breaker, which also serves as a switch for so connecting the primary windings of a motor that high and low speed may be secured, both the number of switches required and the number of steps required to start the motor are materially diminished.

While we have shown our invention in a preferred form, it is apparent that minor modifications may be made, such, for example, as employing a circuit breaker having a rotatable drum instead of one shown in the drawing, without departing from the spirit of the invention. We desire, therefore, to be limited only by the scope of the appended claims.

We claim as our invention:

1. In a motor-control system, the combination with a motor having a plurality of primary phase windings, of a circuit breaker adapted, in one position, to so connect said windings as to provide a predetermined number of poles and to so connect them, in another position, as to provide a different number of poles, said circuit breaker being adapted, in one position, to automatically disconnect said windings upon the occurrence of abnormal electrical conditions in said windings and, in the other position, to maintain said windings connected during abnormal electrical conditions in said windings.

2. In a motor-control system, the combination with an induction motor having a plurality of primary phase windings, of a circuit breaker adapted when in one position, to so connect said windings as to provide a predetermined number of poles and to disconnect said windings upon the occurrence of abnormal electrical conditions in said windings and, when in another position, to so connect said windings as to provide one-half the said predetermined number of poles and to maintain said windings connected during abnormal-current conditions in said windings.

3. The combination with an induction motor having a plurality of primary phase windings, of a starting switch adapted to connect said phase windings in two different relations to each other, means for holding said switch in one position during the period that said windings are connected in one relation, electro-responsive means for adjusting the motor torque when so connected, and automatic means for opening said switch upon abnormal voltage conditions in said windings during the period that said windings are connected in the other relation.

4. The combination with a two-speed induction motor having a plurality of primary and secondary phase windings and a starting switch having a plurality of positions for connecting said primary windings for two different speeds, of means for automatically opening said switch upon the occurrence of abnormal electrical conditions when said motor is operating at one speed, a resistor in circuit with said secondary windings during the starting operation of said motor at the same speed, an additional resistor adapted to be connected in circuit with said secondary winding only during the operation of said motor at the other speed, and means for automatically inserting said additional resistor in circuit with said secondary winding during abnormal current conditions in said windings.

5. The combination with an electric motor having a plurality of phase windings, of a circuit interrupter for connecting said windings for normal operating conditions and for connecting said windings to secure greater torque under predetermined operating conditions, means for automatically opening said circuit interrupter upon a change in current in said windings during normal operating conditions, and means for maintaining said circuit interrupter unresponsive to the electrical conditions of said windings under said predetermined operating conditions.

6. The combination with a dynamo-electric machine having a plurality of phase windings and an automatic circuit interrupter adapted to connect said windings in different relations to each other for two different sets of operating conditions, of means comprising a maximum-torque relay for co-operating with said circuit interrupter during the operation of said motor under one set of operating conditions.

7. The combination with a dynamo-electric machine having a plurality of primary and secondary phase windings and an automatic circuit breaker adapted to connect said windings in two different relations to each other for two different sets of operating conditions, of means comprising a relay for releasing said circuit breaker during the operation of said motor under one set of operating conditions, a resistor, a contactor for inserting said resistor in series with said secondary winding, and means comprising a relay for controlling said contactor, said controlling relay being operative only during the other set of operating conditions.

In testimony whereof, we have hereunto subscribed our names this 14th day of October, 1920.

WALTER L. HARTZELL.
GEORGE W. HUEY.